(12) United States Patent
Cambou

(10) Patent No.: US 10,979,221 B2
(45) Date of Patent: Apr. 13, 2021

(54) GENERATION OF KEYS OF VARIABLE LENGTH FROM CRYPTOGRAPHIC TABLES

(71) Applicant: Arizona Board of Regents on Behalf of Northern Arizona University, Flagstaff, AZ (US)

(72) Inventor: Bertrand F. Cambou, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 341 days.

(21) Appl. No.: 16/237,366

(22) Filed: Dec. 31, 2018

(65) Prior Publication Data

US 2019/0207758 A1  Jul. 4, 2019

Related U.S. Application Data

(60) Provisional application No. 62/613,166, filed on Jan. 3, 2018.

(51) Int. Cl.
*H04L 9/08* (2006.01)
*H04L 9/30* (2006.01)
(Continued)

(52) U.S. Cl.
CPC .......... *H04L 9/0863* (2013.01); *H04L 9/0618* (2013.01); *H04L 9/0643* (2013.01); *H04L 9/0662* (2013.01); *H04L 9/0866* (2013.01); *H04L 9/0869* (2013.01); *H04L 9/30* (2013.01); *H04L 63/0428* (2013.01); *H04L 63/061* (2013.01); *H04L 63/083* (2013.01); *H04L 2463/061* (2013.01); *H04L 2463/081* (2013.01)

(58) Field of Classification Search
CPC ... H04L 9/0863; H04L 9/0618; H04L 9/0643; H04L 9/0662; H04L 9/0866; H04L 9/0869; H04L 9/30; H04L 63/0428; H04L 63/061; H04L 63/083; H04L 2463/061; H04L 2463/081
See application file for complete search history.

(56) References Cited

U.S. PATENT DOCUMENTS 4,218,582 A * 8/1980 Hellman ................... H04L 9/30
380/30
9,648,011 B1 * 5/2017 Mattsson ............. H04L 9/3226
(Continued)

*Primary Examiner* — Peter C Shaw
*Assistant Examiner* — Zhe Liu
(74) *Attorney, Agent, or Firm* — Quarles & Brady LLP

(57) ABSTRACT

A cryptographic infrastructure, which provides a method for generating private keys of variable length from a cryptographic table and a public key. This infrastructure provides an approximation of the one-time pad scheme. The cryptographic table is shared between a message sender and a message recipient by a secure transfer. After sharing the cryptographic table, no new private keys need to be sent—the private keys are independently generated by each party from the data contained within the shared cryptographic tables, using the public key. After public keys are exchanged, private keys may be generated and used to encrypt and decrypt messages and perform authentication cycles, establishing a secure communication environment between the sender and the recipient.

20 Claims, 12 Drawing Sheets

(51) Int. Cl.
*H04L 9/06* (2006.01)
*H04L 29/06* (2006.01)

(56) References Cited

U.S. PATENT DOCUMENTS

| | | | |
|---|---|---|---|
| 10,069,805 B1* | 9/2018 | Carlson | H04L 63/062 |
| 10,608,813 B1* | 3/2020 | Lazier | G06F 21/602 |
| 2004/0158708 A1* | 8/2004 | Peyravian | H04L 9/0825 |
| | | | 713/156 |
| 2006/0031291 A1* | 2/2006 | Beckemeyer | H04N 21/4223 |
| | | | 709/204 |
| 2006/0171534 A1* | 8/2006 | Baughman | H04L 9/0618 |
| | | | 380/47 |
| 2013/0212385 A1* | 8/2013 | Schechter | H04L 9/0877 |
| | | | 713/168 |
| 2016/0087646 A1* | 3/2016 | Motwani | H03M 5/16 |
| | | | 708/204 |
| 2017/0353302 A1* | 12/2017 | Fernandez | G06F 21/6254 |

* cited by examiner

GENERATION OF KEYS OF VARIABLE LENGTH FROM CRYPTOGRAPHIC TABLES

CROSS-REFERENCE TO RELATED APPLICATIONS

This application claims priority to U.S. Provisional Patent Application No. 62/613,166 entitled "Generation of Keys with Variable Length (KVL) from Cryptographic Tables" and filed on Jan. 3, 2018.

STATEMENT REGARDING FEDERAL SPONSORED RESEARCH

This invention was made with Government support under grant no. FA8075-16-D-0001 awarded by the U.S. Department of Defense. The Government has certain rights in the invention.

FIELD OF THE INVENTION

The present invention relates to the generation of keys pertaining to cybersecurity and data encryption.

BACKGROUND

Encryption is a method to prevent a third party from intercepting messages between two parties. Encryption generally involves converting a message from plain text into encrypted text, which can be safely sent over a non-secure channel because the encrypted text cannot by understood unless decrypted. The message can only be decrypted with a particular private key. In a symmetric encryption scheme, the same private key is used to encrypt and decrypt the message. This private key is a shared secret of the message sender and the intended recipient.

A central goal of cryptography is creating schemes that cannot be easily broken. Such schemes do not allow for easy decryption without prior knowledge of the private key. An encryption scheme that is known to be highly resistant to cryptographic analysis is the one-time pad. This method uses a unique private key for each message, with the private key being at least as long as the message. Because the private key is at least as long as the message, there is no need to reuse information from the private key. Similarly, using a new private key for each message eliminates reuse between messages. Without reuse of the information from the private key, there is no avenue to perform an analysis to break the private key. However, the one-time pad scheme has several practical disadvantages: 1) it requires a secure transfer of a large set of long private keys, in order to allow a private key for each message to be encrypted, and 2) it can require very long private keys for long messages.

SUMMARY

The present invention provides systems and methods comprising one or more server hardware computing devices or client hardware computing devices, communicatively coupled to a network, and each comprising at least one processor executing specific computer-executable instructions within a memory.

In an embodiment, a computing device includes a non-volatile memory including a cryptographic table comprising an array of addressable elements, wherein each addressable element has a numerical value, a network interface configured to communicate using a communications network, and a processor coupled to the network interface. The processor is configured to execute instructions for receiving, using the network interface, a public key and an encrypted message, combining the public key with an additional identifying information to generate a first input, executing a hash function on the first input to generate a hash digest, and parsing the hash digest into a first set of addresses, wherein each address in the first set of addresses identifies an addressable element in the cryptographic table. The processor is configured to execute instructions for generating a private key by retrieving numerical values associated with the addressable elements in the cryptographic table having addresses in the first set of addresses, and decrypting the encrypted message using the private key to generate an unencrypted message.

In another embodiment, a computing device includes a non-volatile memory, including a cryptographic table comprising an array of addressable elements, wherein each addressable element has a numerical value, a network interface configured to communicate using a communications network, and a processor coupled to the network interface, including a random number generator. The processor is configured to execute instructions for generating a random public key by extracting a random number from the random number generator, combining the random public key with an additional identifying information to generate a first input, and executing a hash function on the first input to generate a hash digest. The processor is configured to execute instructions for parsing the hash digest into a first set of addresses, wherein each address in the first set of addresses identifies an addressable element in the cryptographic table, generating a private key by retrieving numerical values associated with the addressable elements in the cryptographic table having addresses in the first set of addresses, encrypting an unencrypted message using the private key to generate an encrypted message, and sending, using the network interface, the random public key and the encrypted message.

In another embodiment, a method of decrypting an encrypted message includes receiving, using a network interface configured to communicate using a communication network, a public key and an encrypted message, combining, using a processor coupled to the network interface and configured to execute instructions, the public key with an additional identifying information to generate a first input, and executing a hash function on the first input to generate a hash digest. The method includes parsing the hash digest into a first set of addresses, wherein each address in the first set of addresses identifies an addressable element in a cryptographic table, wherein the cryptographic table is stored within a non-volatile memory coupled to the processor, generating a private key by retrieving numerical values associated with the addressable elements in the cryptographic table having addresses in the first set of addresses, and decrypting the encrypted message using the private key to generate an unencrypted message.

The above features and advantages of the present invention will be better understood from the following detailed description taken in conjunction with the accompanying drawings.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
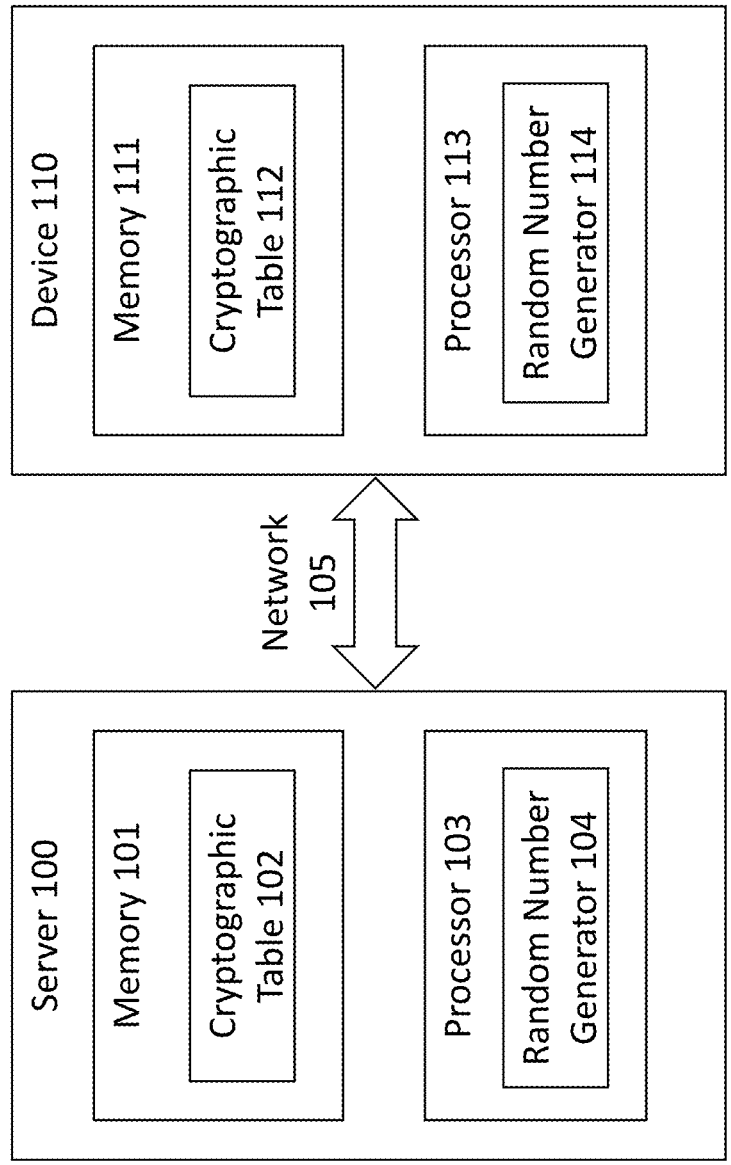
FIG. 1 illustrates a component diagram of systems which may embody the PKA infrastructure, according to one embodiment.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present disclosure describes a Public Key Infrastructure that is Addressable (PKA). This infrastructure provides a method for generating private Keys of Variable Length (KVL). The purpose of these private keys is to securely encrypt and decrypt messages sent between a sender and a recipient. This novel infrastructure provides an approximation of the one-time pad scheme, but with several practical advantages.

In a symmetrical encryption scheme such as PKA, a public key serves as a prompt for the message sender and the message recipient to each generate the same particular private key. The public key is shared in a communication channel that is assumed to be insecure. As a simplified analogy: if the sender and the recipient each have an identical book with a private key on each page, then the public key could be a page number. That is, the public key provides enough information for the sender and the recipient to generate the same private key, but not enough information for a third party to infer the private key.

The PKA infrastructure provides a method for generating private keys of variable length (KVLs) from a cryptographic table. The cryptographic table includes an array of digits of a given format, with an illustrative example being a two-dimensional array of bits having 256 rows and 256 columns for a total size of 65,536 bits. This cryptographic table is shared between the message sender and recipient by a secure transfer.

After sharing the cryptographic table, no new private keys need to be sent or exchanged between the parties—the private keys are independently generated by each party from the data contained within the shared cryptographic tables. This has several advantages over a conventional one-time pad scheme: 1) only one transfer of a cryptographic table is needed to generate many private keys, and 2) the scheme can generate private keys across a wide range of lengths which can be made appropriate to the message to be sent.

The present PKA infrastructure provides a method for using a public key as an address for determining the private key from the private cryptographic tables. Specifically, the address is used to access particular values within the cryptographic table to construct a private key of a desired length. After public keys are exchanged, the private keys, once generated, are used to encrypt and decrypt messages and perform authentication cycles, establishing a secure communication environment between the sender and the recipient.

It is one objective of the present invention to generate cryptographic keys having lengths in the same order of magnitude as the plain text content (e.g., text or other data) to be encrypted—that is, the cryptographic keys may have the same number of bits as the data to be encrypted—and to be able to use simple operations such as an exclusive OR (an XOR) to securely encrypt the plain text content.

It is another objective of the invention to allow the communicating parties to independently generate the same cryptographic keys to encrypt plain text content enabling safe exchange of encrypted messages over unprotected networks. For this purpose, the present invention may use the described cryptographic tables and corresponding public key infrastructure that is addressable (PKA) and the public key exchange scheme as described herein. As described herein, the cryptographic keys can be generated using public keys that are not required to be secret and can be exposed to a third party. The third party, even in possession of the public keys cannot generate the corresponding cryptographic keys because the third party is not in possession of the described cryptographic tables.

It is another objective of the present invention to provide a method that can be low cost, fast, and implementable with client devices having low computing power such as the Internet of Things (IoT) devices implement low-power and mobile microprocessors. In embodiments, the present PKA key exchange scheme does not need the computing power of other PM protocols such as Rivest-Shamir-Adleman (RSA) and Elliptic Curve Cryptography (ECC). Instead, one-time pad-based methods or encrypting and decrypting messages which can use a simple operation such as XOR as encryption schemes face the difficulty of sharing, storing, and extracting long keys. Polymorphic cryptography methods need codes that are more complicated than single key cryptography. As such, the present method may not require substantial computing power and may be implemented on low cost devices, such as Java cards, IOT devices, mobile device, and the like.

The PKA infrastructure and KVL generation techniques are described herein using a message between a server and a device. The server and the device may each be either the sender or the recipient of the message. The server is a central computing device having memory, processing, and networking capabilities, with illustrative examples including an internet server and an intranet server. The device is a user computing device having memory, processing, and networking capabilities, with illustrative examples including a terminal device, a secure microcontroller, a smartphone, and a smartcard.

The system components are depicted in FIG. 1. The server 100 and device 110 both contain non-volatile memory 101 and 111 for storing the shared cryptographic tables 102 and 112, and processors 103 and 113 for performing the encryption/decryption operations and random number generators 104 and 114 to create public keys.

The initial step of the PKA, also referred to as personalization, is based on the generation of one cryptographic table 102 and 112 per client device 110 using a true random number generator 104 on the secure server 100 of the network 105. For example, each table 102 and 112 can have the format of 256 rows and 256 columns for a total density of 65,536 bits. The memory 101 and 111 can be a traditional binary memory storing bits (binary digits; 0, 1), or a multi-state memory storing trits (trinary digits; –, 0, +), qubits (quaternary digits), or any multi-bit state. During personalization, one cryptographic table 112 is securely downloaded from the server 100 to the connected device 110. The device 110 has secure non-volatile memory 111 embedded in it to store its cryptographic table 112 matching the cryptographic table 102 that is securely kept in the server 100. The encryption and decryption of the PKA relies on the server and the device each having access to identical secret cryptographic tables so that cryptographic table 102 and cryptographic table 112 are similarly configured and each contain the same numerical values.

Figure 2:
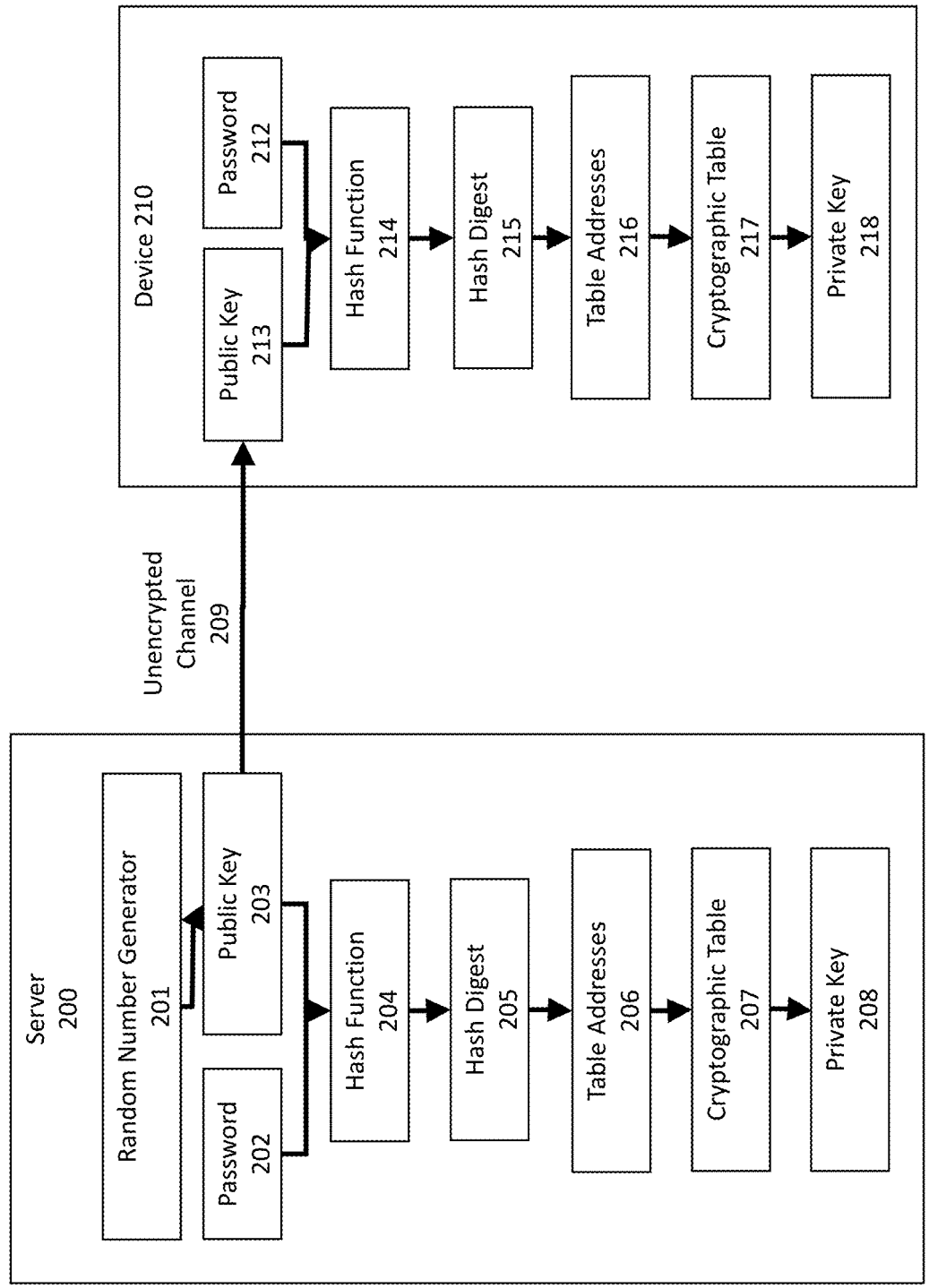
FIG. 2 illustrates a block diagram of the processes of KVL generation.

FIG. 2 shows the process of independently generating private keys on the server 100 and device 110, from a public key. This process produces the identical private keys 208 and 218 on both server 200 and device 210. With private keys 208 and 218 generated, each of server 200 and device 210 can use private keys 208 and 218 to encrypt plain text messages for secure transmission. Additionally, server 200 and device 210 can use their respective private keys 208 and 218 to decrypt received encrypted messages.

Initially, the server 200 creates the public key 203. The public key is an arbitrary number, created by the random number generator 201, having a given length such as 1024 bits, 2048 bits, or another given number of bits. The server shares the public key 203 over the non-secure network 209, with the device 210 receiving the public key 213. Alternately, this process may be performed in reverse with the device 210 generating a public key 213 and sending it to the server 200. In an embodiment, the public key 203 may be generated by reading a predetermined number of values or bits out of a random number generator, such as random number generator 201 within sever 200.

On the server 200, the public key 203 is passed through a hash function 204 along with a password 202. The password may be provided by a user entering a password containing a number of characters through a suitable user interface connected or coupled to server 200. In embodiments, the user interface may be a keyboard or other data entry device. In other embodiment, the user interface may include a sensor device, such as an optical sensor (e.g., optical camera, infrared camera, or iris scanner) or audio sensor (e.g., a microphone) configured to capture biometric data (e.g., face images, iris scans, or voice data) associated with the user. Once captured, the biometric data may be converted into a suitable string of characters, digits, or values that may be utilized as the password. In still other embodiments, the biometric data may be combined with an entered value (e.g., entered by the user into a keyboard or other user interface device) to generate the password.

Hash function 204 is a one-way (that is, infeasible to invert) deterministic function that generates a fixed-length hash digest output from in input message of arbitrary length. Example hash functions include SHA-1. SHA-2, or SHA-3.

The hash function 204 generates an output digest 205 from the combination of the input public key 203 and password 202. Given the same input, the hash function 204 will produce the same digest 205. It is notable that a small change in the input to the hash function 204 will greatly change the hash digest output 205. The hash digest 205 is then parsed apart into table addresses 206. The parsing process comprises grouping the digits of the digest 205 outputted by hash function 204 into multiple groups of a given length, where the length of each group of digits is equal to the number of digits used to locate an entry in the cryptographic table. Each address refers to a location in the cryptographic table 207, such as by row and column. From each location, a stream of bits is read from the table 207. These streams are appended to produce the private key 208.

In a similar manner, on the device 210 the public key 213 (e.g., received by the device 210 via a network interface configured to communicate with server 200) is passed through a hash function 214 with a password 212. The hash function 214 generates an output digest 215 from the input public key 213 and password 212. The password may be provided by a user entering the password (password 212 and password 202 have the same values) containing a number of characters through a suitable user interface connected or coupled to device 210. In embodiments, the user interface may be a keyboard or other data entry device. In other embodiment, the user interface may include a sensor device, such as an optical sensor (e.g., optical camera, infrared camera, or iris scanner) or audio sensor (e.g., a microphone) configured to capture biometric data (e.g., face images, iris scans, or voice data) associated with the user. Once captured, the biometric data may be converted into a suitable string of characters, digits, or values that may be utilized as the password. In still other embodiments, the biometric data may be combined with an entered value (e.g., entered by the user into a keyboard or other user interface device) to generate the password.

Once generated, the hash digest 215 is then parsed apart into table addresses 216. Each address refers to a location in the cryptographic table 217. From each location, a stream of bits is read from the table 217. These streams are appended to produce the private key 218.

Accordingly, at the completion of the process depicted in FIG. 2, both server 200 and device 210 have processed the same public key 203 and 213, which was distributed via unencrypted channel 209 to generate private keys (private keys 208 and 218) using secure cryptographic tables 207 and 217. A third party, who comes into possession of the public key 203 or 213 (e.g., by snooping traffic occurring on unencrypted channel 209), would not be able to independently generate private keys 208 and 218 as the third party is not in possession of the contents of either of cryptographic table 207 or cryptographic table 217.

Figure 3:
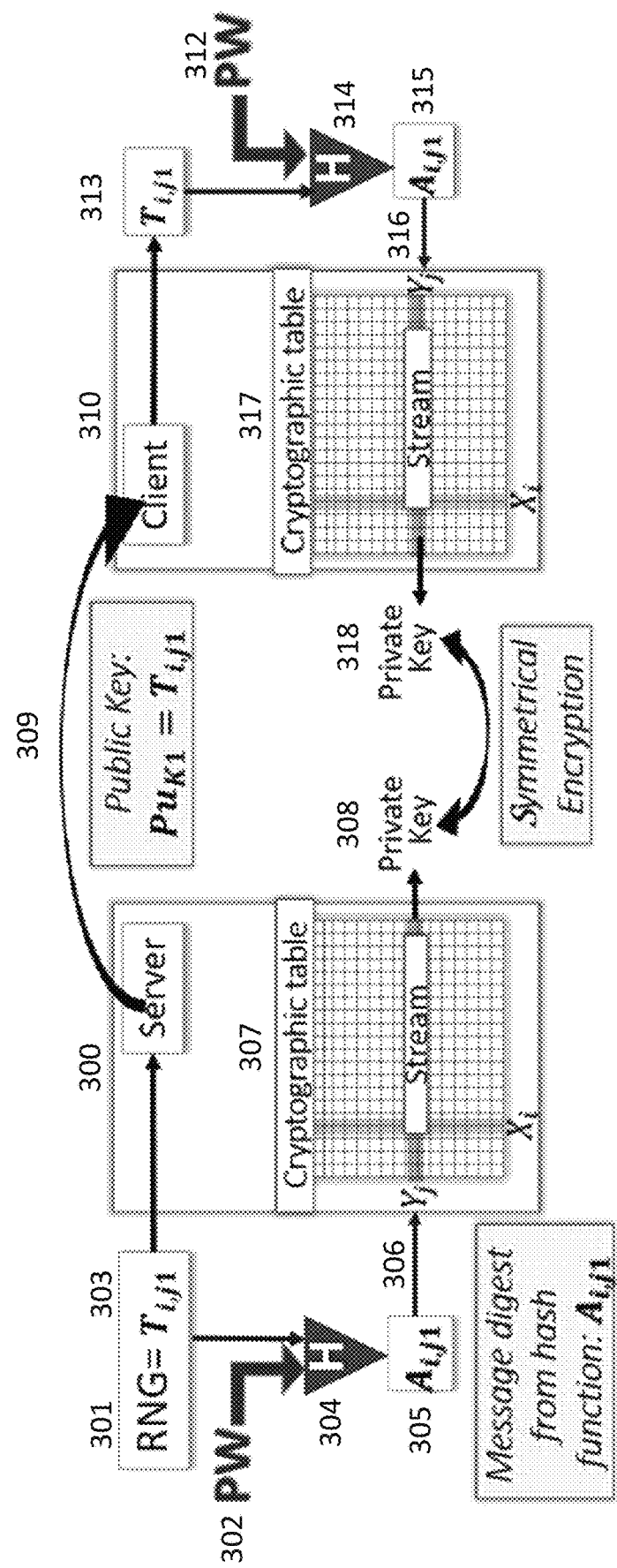
FIG. 3 illustrates an additional block diagram of the processes of KVL generation.

This process of independent generation of the private keys is further illustrated in FIG. 3. In FIG. 3, server 300 and client device 310 wish to communicate securely. Server 300 includes a cryptographic table 307 containing a number of different numerical values (the values may be bits or trits).

Similarly, device 310 includes cryptographic table 317 containing a number of different numerical values. Cryptographic table 307 and cryptographic table 317 have the same layout and contain the same numerical values. The numerical values contained in each of cryptographic table 307 and cryptographic table 317 are each associated with a location within the respective tables and are thereby addressable using a suitable address.

In the depicted example, binary random number Tij1 of a given length is created by a random number generator 301 on the server 300 to become the public key 303 that is openly shared on a network 309 between the communicating parties 300 and 310.

Within the server 300, the random number Tij1 is passed through a hash function 304 with an additional code 302 (e.g., password, pin code, biometric print, fingerprint, retina reading). The message digest 305 of the hash function 304 is interpreted as an address 306 Aij1={Xi, Yj} in the cryptographic table 307. For example, with a 256×256 cryptographic table 307, the first 8 digits of the hash message 305 can be the address 306 of the column Xi, and the next 8 digits can be the address 306 of row YJ. The private key 308 can be the stream Prij1=Cij1={Cij11, . . . , Ci,jlk} of k bits that are located in the cryptographic table 307 following the address Ai,i1 306. The k bits needed for the private key 308 can be extracted from the rolling following rows in the table 307 if the address 306 pointed by the public key 303 is located at the end of a row. The random number generator 301 output Tij1 can also be dynamically changed to different numbers Ti,j2, resulting in a different public keys 303, a different address Ai,j2 306 and a different private keys Ci,j2 308. If the address 306 pointed by the public key 303 is located at the bottom of the table 307, the rolling following rows can be located at the top section of the table 307 in such a way that a fixed length of 256 bits is always extracted for the private key 308.

The public key is transmitted from server 300 to device 310 through a suitable communication channel. The communication channel may be secured or unsecured, depending upon the configuration of the communication channel.

Upon receipt of the public key, device 310, in a similar manner to that performed by server 300, and with all above stipulations, passes the public key 313 is through a hash function 314 with an additional code 312, which may be a password, as described above. The message digest 315 of the hash function 314 is interpreted as an address 316 in the device cryptographic table 317 (which is identical to the server cryptographic table 307). The private key 318 can be the stream of k bits that are located in the cryptographic table 317 following the address 316.

Specifically, within the device 300, the public key is passed through a hash function 314 with an additional code 312 (e.g., password, pin code, biometric print, fingerprint, retina reading). The message digest 315 of the hash function 314 is interpreted as an address 316 Aij1={Xi, Yj} in the cryptographic table 317. Because server 300 and device 310 implement similarly-configure hash functions 304 and 314, the address 316 will be equal to the address 306 independently generated by server 300. For example, with a 256×256 cryptographic table 317, the first 8 digits of the hash message 315 can be the address 316 of the column Xi, and the next 8 digits can be the address 316 of row YJ. The private key 318 can be the stream Prij1=Cij1={Cij11, . . . , Ci,jlk} of k bits that are located in the cryptographic table 317 following the address Ai,i1 306. The k bits needed for the private key 318 can be extracted from the rolling following rows in the table 317 if the address 316 indicated by the public key 313 is located at the end of a row. If the address 316 pointed at by the public key 309 is located at the bottom of the table 317, the rolling following rows can be located at the top section of the table 317 in such a way that a fixed length of 256 bits is always extracted for the private key 318.

The public key 303 transmitted is Pui,j1={Tij1}. The communication parties server 300 and device 310 can therefore use the private keys 308 and 318 respectively separately to encrypt and decrypt messages with symmetrical encryption schemes. Only the server 300 and the client device 310 with the appropriate cryptographic table 307 and 317 respectively can generate the same private key 308 and 318 respectively for the PKA protocol, a third party without the same exact cryptographic table 307 cannot extract the same private key 308 from the same public key 303.

This enables server 300 and device 310 to exchange the public key using a non-secure communication channel. Upon exchange of the public key, however, server 300 and device 310 can independently generate private keys known only to server 300 and device 310, where the private keys can then be used to secure communications between server 300 and device 310.

Figure 4:
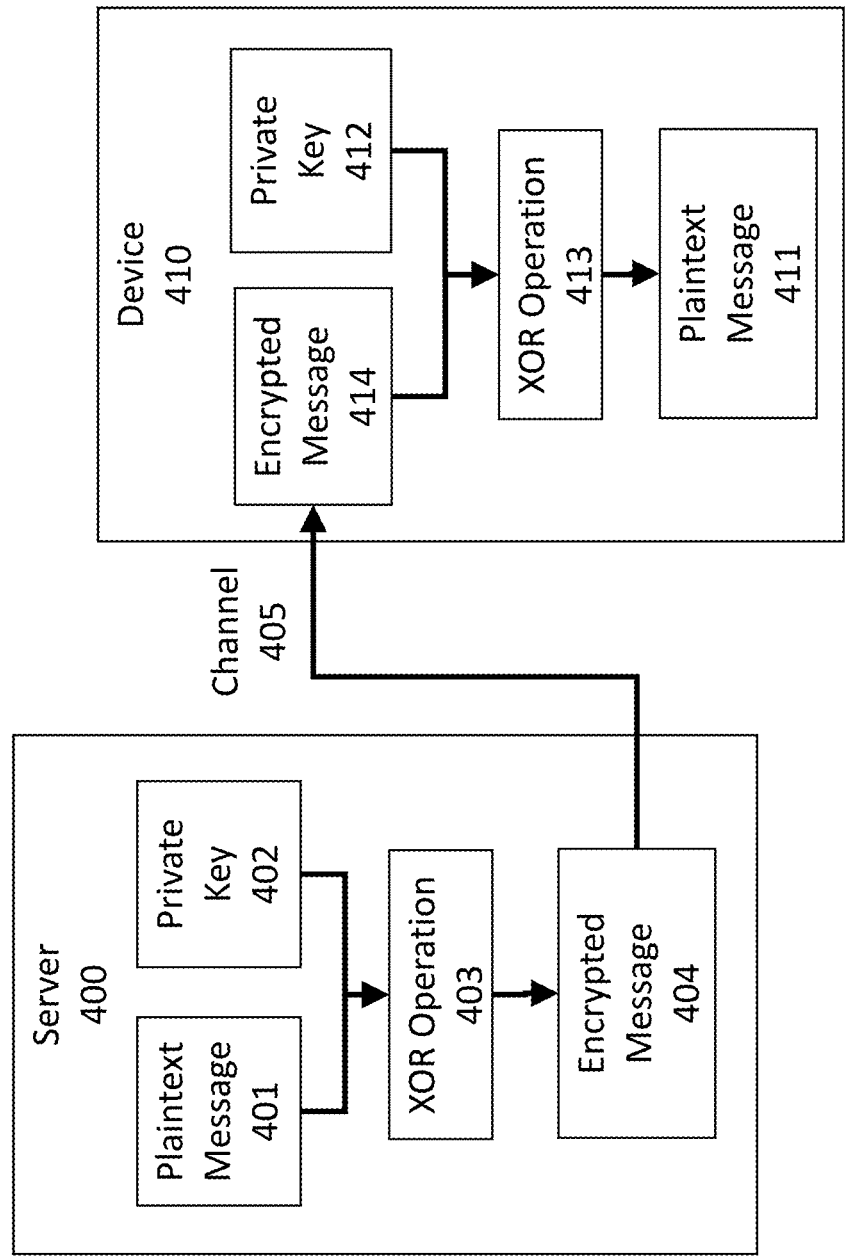
FIG. 4 illustrates a block diagram of the process of message encryption and decryption under the PKA infrastructure.

FIG. 4 shows an example process of sending a message from the server 400 to the device 410 after generating the private keys 402 and 412 respectively as per the previous descriptions. Although FIG. 4 depicts server 400 transmitting an encrypted message to device 410, it should be understood that a substantially similar method may be utilized to transmit an encrypted message from device 410 to server 400.

Plaintext or original message 401 includes a number of digits or characters that are to be transmitted to device 410. To encrypt original message 401, server 400 first generates a private key 402 using the methods and approaches described above. Generally, private key 402 has a length that is equal to or approximately equal to the length of original message 401.

The original message 401 is encrypted by the private key 402, using a reversible operation 403 such as an exclusive OR operation (XOR). After encryption, the encrypted message 404 can be sent to the device 410 by a non-secure network 405.

Upon receipt of encrypted message 404, device 410 independently generates private key 412 using the methods described above. Private key 412, like private key 402, has a length that is equal to or approximately equal to the length of encrypted message 404.

The received encrypted message 414 is decrypted by device 410 using an additional XOR operation 413 with the private key 412 (identical to private key 402) to produce a recreation 411 of the original message 401. This process may be reversed, with the device 410 sending a message to the server 400.

Figure 5:
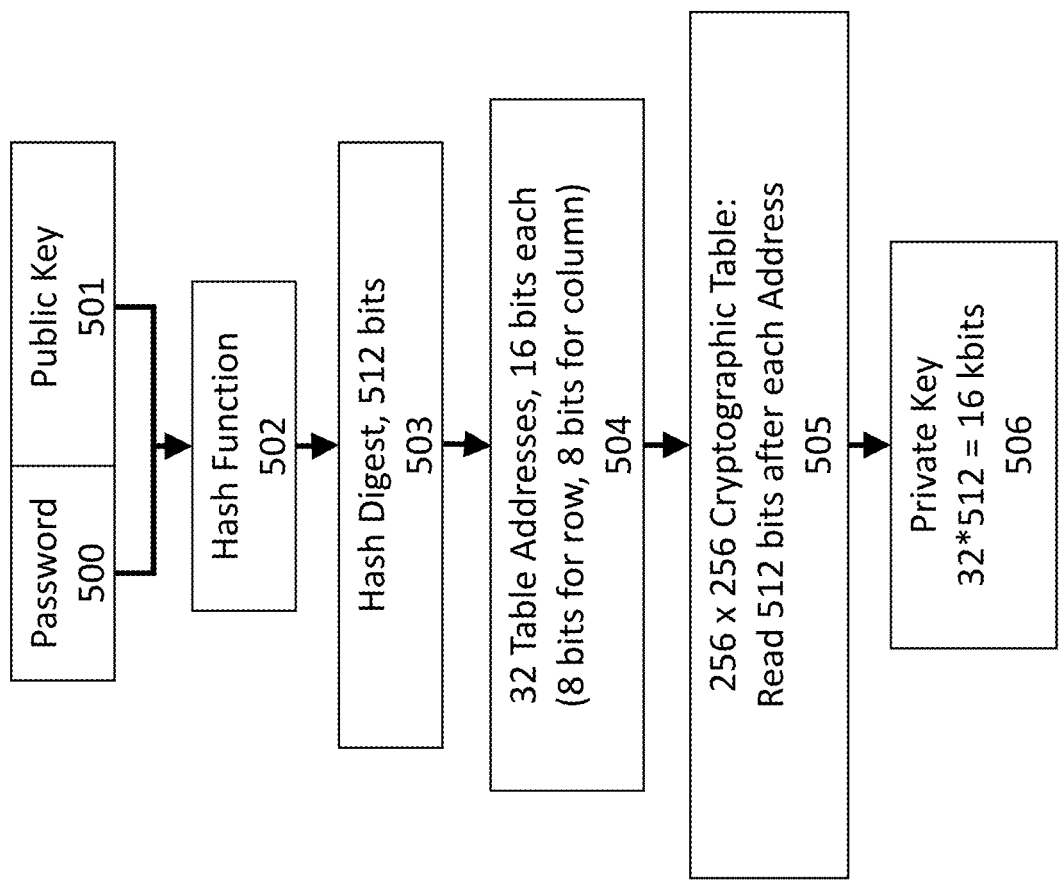
FIG. 5 illustrates a block diagram with a numerical example of the KVL generation process.

FIG. 5 is a flowchart depicted steps in the process of private key generation. FIG. 5 is further annotated to indicate bit-lengths of various values utilized through the key generation process.

In an initial step, the password 500 and public key 501 are passed through a hash function 503 to generate a hash digest 504. The output of hash function 502 may be a hash digest containing 512 bits. The 512 bit digest 504 is parsed into 32 table addresses, with each address having 16 bits—8 bits to specify the table row, and 8 bits to specify the table column. The 8 bits allow for 256 rows and 256 columns in the cryptographic table. For system implementations using cryptographic tables of different sizes, hash functions 502 may be utilized that generate output hash digests 503 of different sizes enabling the hash digest to be parsed into table addresses for the specific cryptographic table.

From each of the addresses 504, a stream of 512 bits is read from the table 505. The stream of 512 bits may be generated by sequentially accessing locations in the cryptographic table starting at the identified location. Upon reaching the end of a particular row in the cryptographic table, the bit stream may be generated by moving to the first value in the next row and sequentially reading values from that row, and so on. Upon reading the last value from the last row in the cryptographic table, the bit stream can be continued by moving to the first value in the first row of the cryptographic table and beginning to read values from that location. These 32 streams of 512 bits are appended together to generate a private key 506 with 32*512 bits=16,384 bits=16 kbits.

Figure 6:
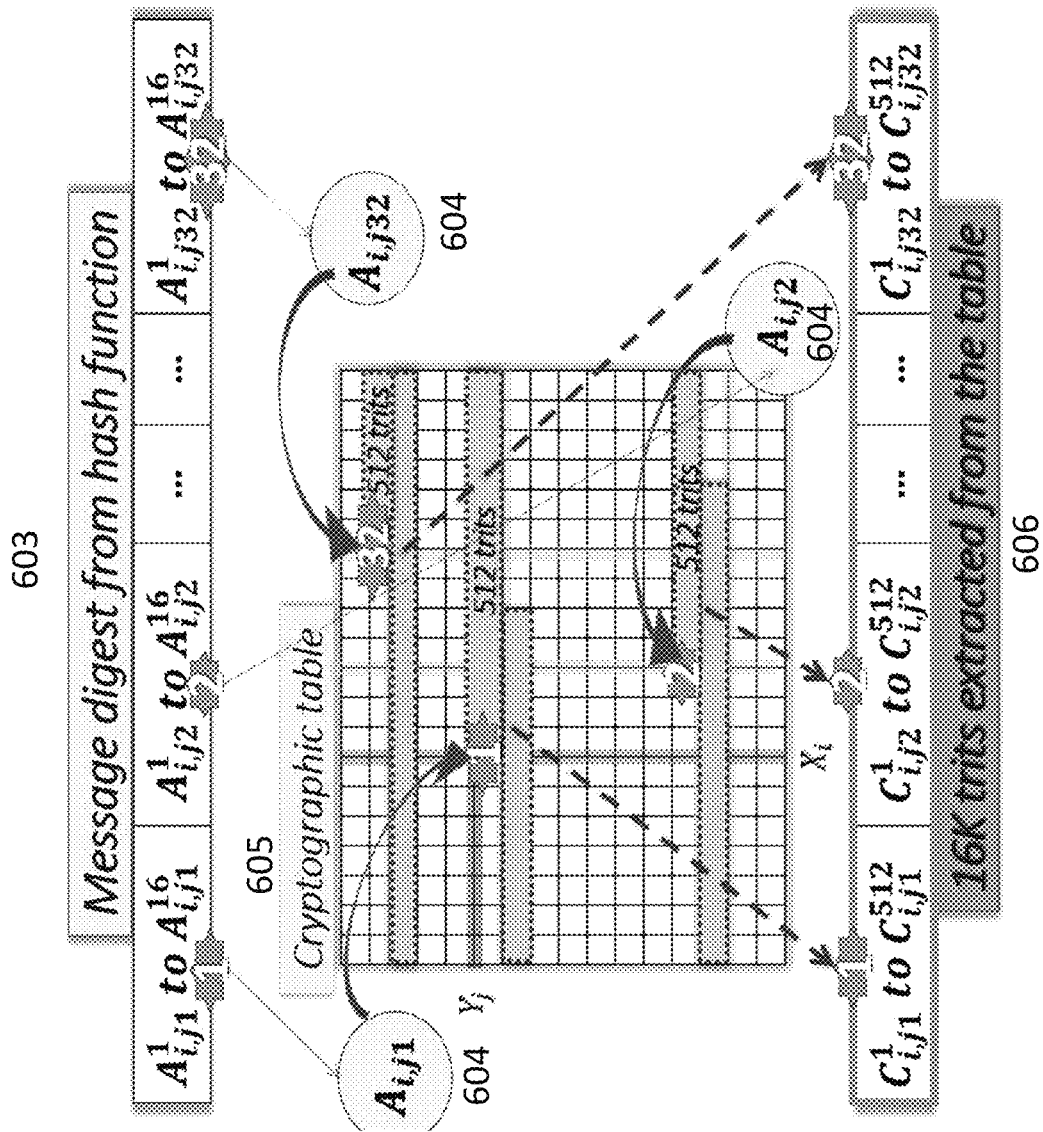
FIG. 6 illustrates an additional block diagram with a numerical example of the KVL generation process.

FIG. 6 shows an example similar to that of FIG. 5, but with a cryptographic table 605 containing trits rather than bits. The process is otherwise identical, of parsing the hash digest 603 into addresses 604 to generate data streams which are appended to produce the private key 606.

In some embodiments, rather than read values sequentially from the cryptographic table to generate the private key, a number of instructions may be identified to modify the way that values are read-out of the cryptographic table. The instructions may result in the values being read into the bit stream used to generate the private key in a non-sequential manner.

Figure 7:
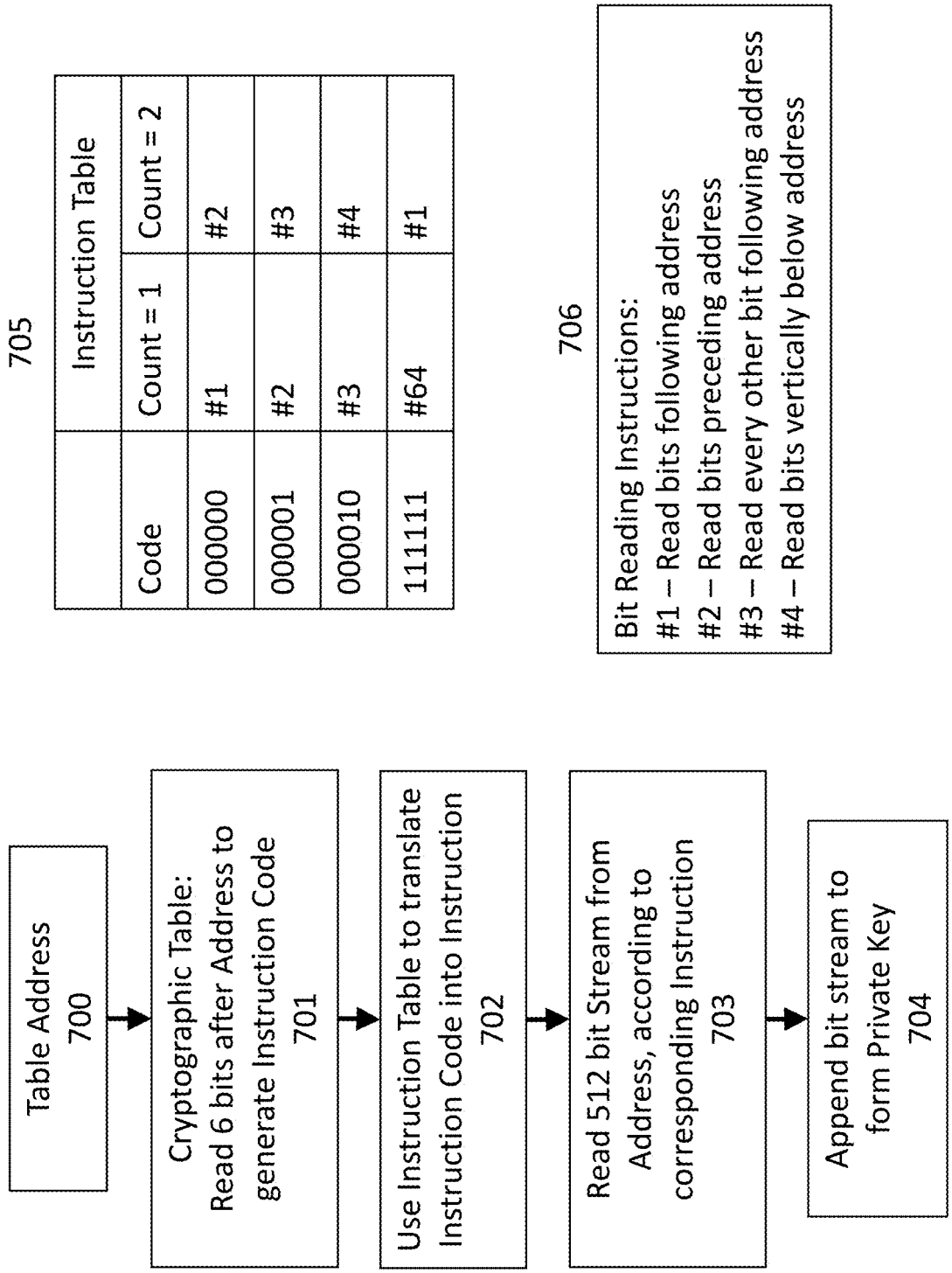
FIG. 7 illustrates a block diagram of the KVL generation process according to an embodiment comprising a table of varying instructions for reading bits to generate the KVL.

FIG. 7 shows an example having an additional step of generating a different bit-reading instruction for each address before reading the bit stream. In this example, a location has been identified in the cryptographic table for the purpose of generating a bit stream for use in creating a private key. FIG. 7 then specifies an approach for, once the location is identified, reading a stream of values out of the cryptographic table.

The purpose of these varying instructions is to increase the entropy of the encryption and thereby make breaking the encryption more difficult. After generating sequence of address by processing a hash digest, as described above (e.g., steps 503 and 504 of FIG. 5). In this example the instruction is determined by reading, from each address 700, the first 6 bits. These bits may be read sequentially from the first address. The first 6 bits will then be converted into an instruction code 701. The instruction code 701 is referenced to the instruction table 705 to find the particular instruction 702.

Several example instruction codes are shown 706. The instruction 702 changes the process of reading the stream of bits 703 from the given address. The bit stream 703 from each address is appended, to generate the private key 704. The varying instructions 706 ensure that nearby addresses 700 will not produce similar bit streams 703. If it is expected that collisions (that is, multiple read events at the same address) will occur frequently, a counting system may be added to the instruction table 705 wherein each occurrence of a code will increment that code's counter and thereby alter the subsequent instruction for that code.

For example, if the first six bits read from a particular address has the value '000000' and are being read for the first time, the instruction code will instruct the device to read bits from the address that follow the address. Alternatively, if the first six bits read from a particular address has the value '000000' and are being read for the second time, the instruction code will instruct the device to read bits from the address that precede the address. If the first six bits read from a particular address has the value '000000' and are being read for the third time, the instruction code may instruct the device to read every other bit that follows the address to create the bit stream. If the first six bits read from a particular address has the value '000000' and are being read for the fourth time, the instruction code may instruct the device to read bits sequential along a column starting at the addresses (rather than reading sequentially along rows) to create the bit stream.

Figure 8:
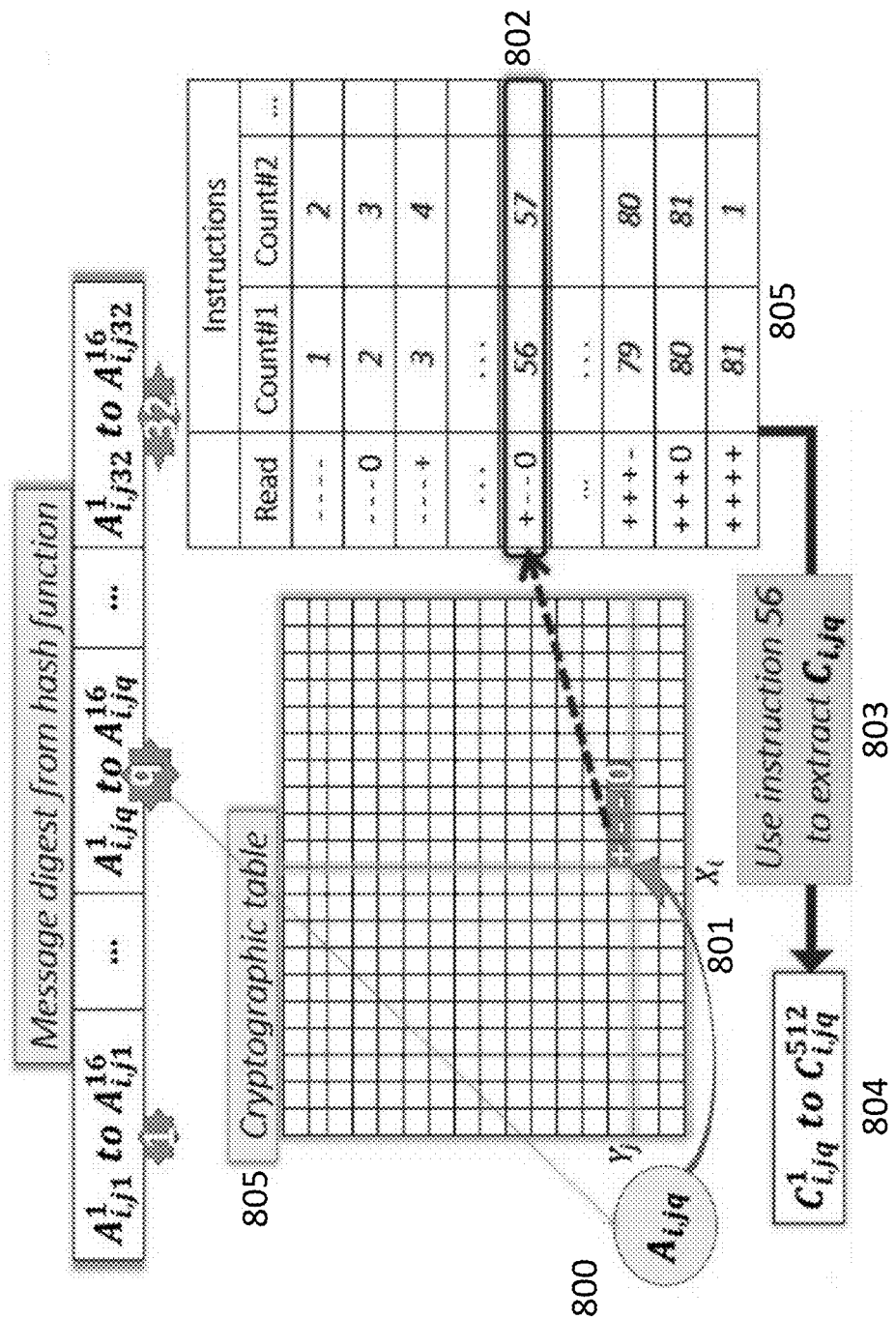
FIG. 8 illustrates an additional block diagram of the KVL generation process according to an embodiment comprising a table of varying instructions for reading trits to generate the KVL.

FIG. 8 shows an example similar to FIG. 7, but with a cryptographic table 805 containing trits rather than bits. A selected number of trits located around the address 800 $A_{i,jq}$ can be read and used to extract an instruction code 801 from the cryptographic table 805. In this example, the trits located at $A_{i,jq}$ (+--0) are pointing to the instruction 56. This particular instruction 802 is used to determine the process for reading trits from the table address 800 to extract the data stream 803. The data streams from all addresses are appended into the private key 804.

A total of 81 instructions (4 trits; 3^4) can be used in this particular example, which can be increased or decreased as a function of how many trits are read to determine the instruction. There are many ways to design a library of instruction sets providing multiple ways to extract data streams from the table. For example, "instruction 1" can provide instructions to read and extract trits located in the 512 array elements following the address; "instruction 2" is similar but skips every other element; "instruction 3" instructs to read and extract the 512 trits in the elements located below the address; "instruction 4" is similar but instructs the addition of a fixed data stream to the resulting stream.

In order to avoid getting identical data streams when the same address is pointed to twice by the message digest, this embodiment includes the use of a counter that tracks how many times the same address is involved in the scheme and shifts the cryptographic table to the right to change the instruction. Thus, different data streams can be generated at that same address when pointed to multiple times by the message digest. This feature may not be required when 32 addresses are selected by the message digest over 65,536 possible addresses because the likelihood of a repeat is statistically very low. However this is valuable when the plain text is long and thousands of addresses are needed to generate very long KVLs.

Figure 9:
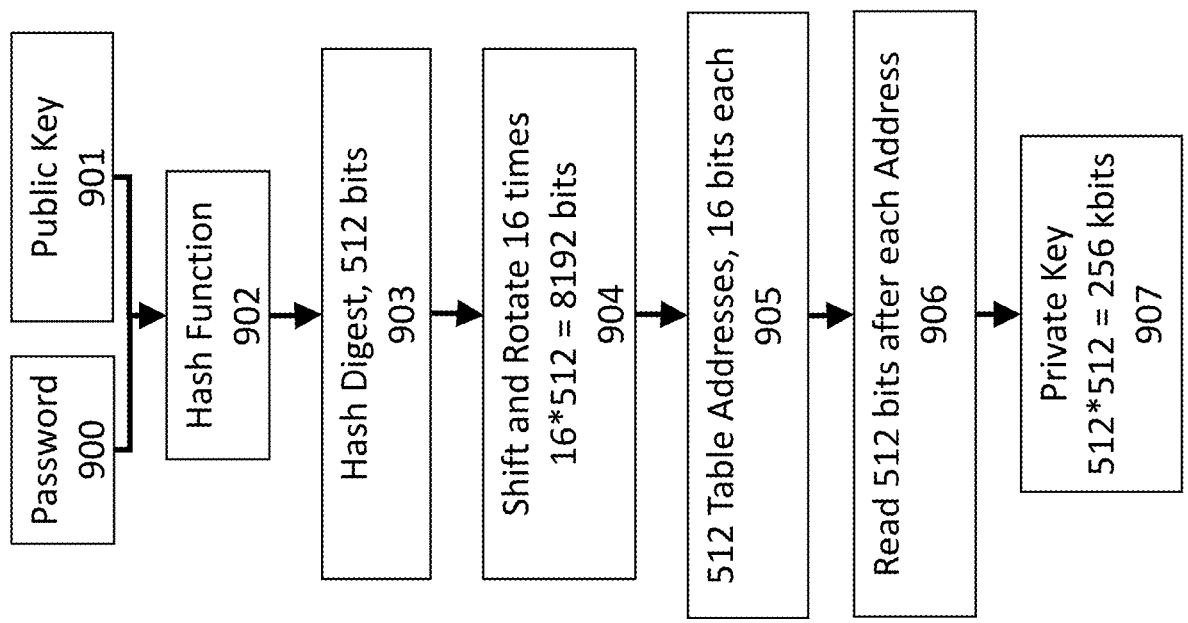
FIG. 9 illustrates a block diagram with a numerical example of the KVL generation process according to an embodiment comprising an additional step to generate a longer KVL.

FIG. 9 shows an example process for generating a longer private key, for example in order to encrypt a longer plaintext message. This process re-uses the hash digest 903 multiple times to make a larger set of addresses 905. As in previous examples, the password 900 and the public key 901 are passed through the hash function 902 to produce the hash digest 903.

In this scheme, the hash digest 903 is utilized 16 times rather than just once. The hash digest 903 is shifted and rotated 904 for each additional usage. These shift and rotate operation 904 yields an entirely separate set of addresses 905 from the same original hash digest 903. All the generated addresses 905 are used to read bit streams 906 from the cryptographic table. These streams are appended to produce the private key 907. The overall effect is to generate a private key having up to 256 kbits, 16 times longer than the key generated using only the original hash digest 903.

It is possible to repeat the method more than 16 times, however the same addresses will then be generated multiple times. Additionally, by using the counter, a different block of 512 bits can be extracted multiple times with minimum collision.

Figure 10:
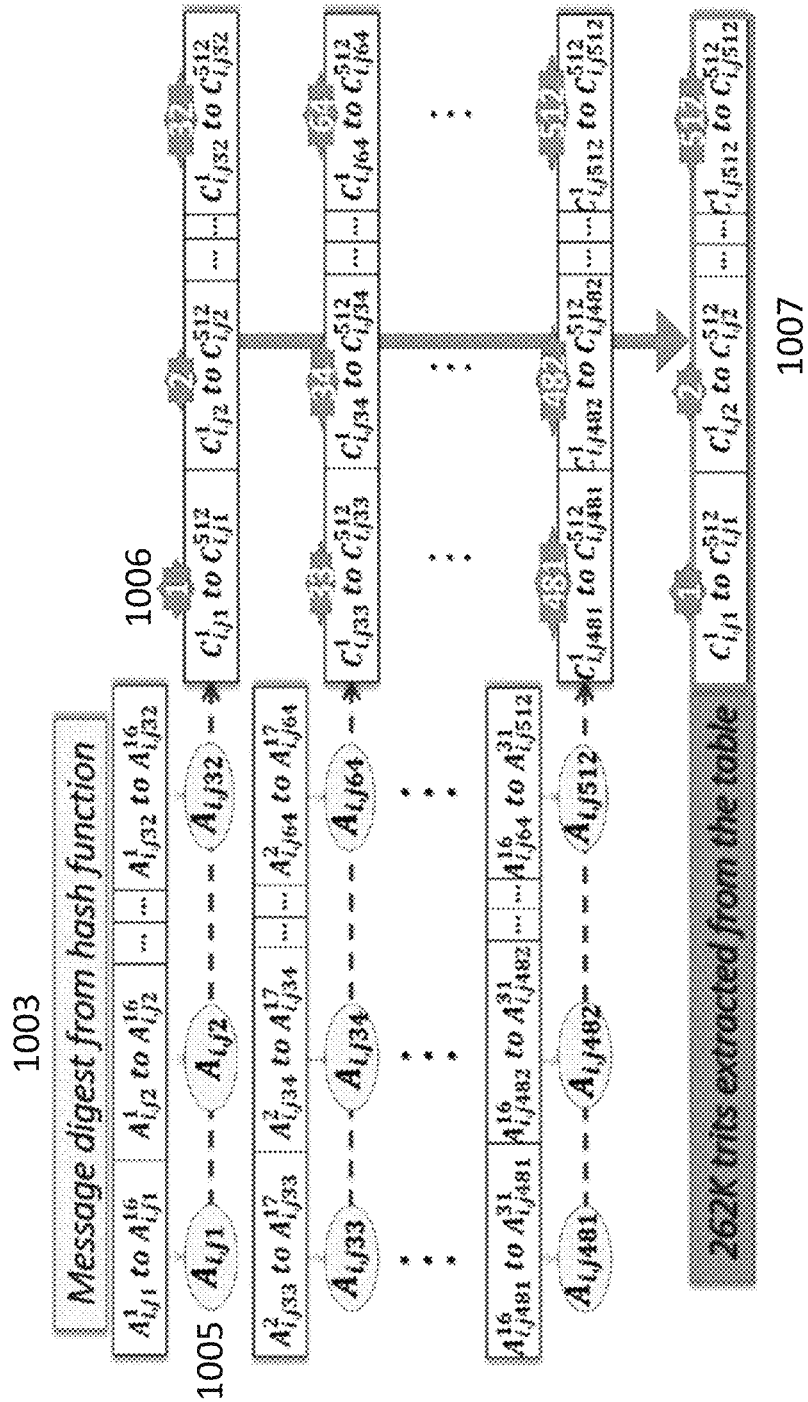
FIG. 10 illustrates a diagram of the KVL generation process according to an embodiment comprising an additional step to generate a longer KVL comprised of trits.

FIG. 10 shows an example similar to FIG. 9 but with a cryptographic table containing trits rather than bits. The hash digest 1003 is parsed in 16 differing directions to generate 16 different sets of addresses 1005. Each address is used to read 512 trits from the cryptographic table 1006, and the resulting bit streams are appended to generate the private key 1007.

Figure 11:
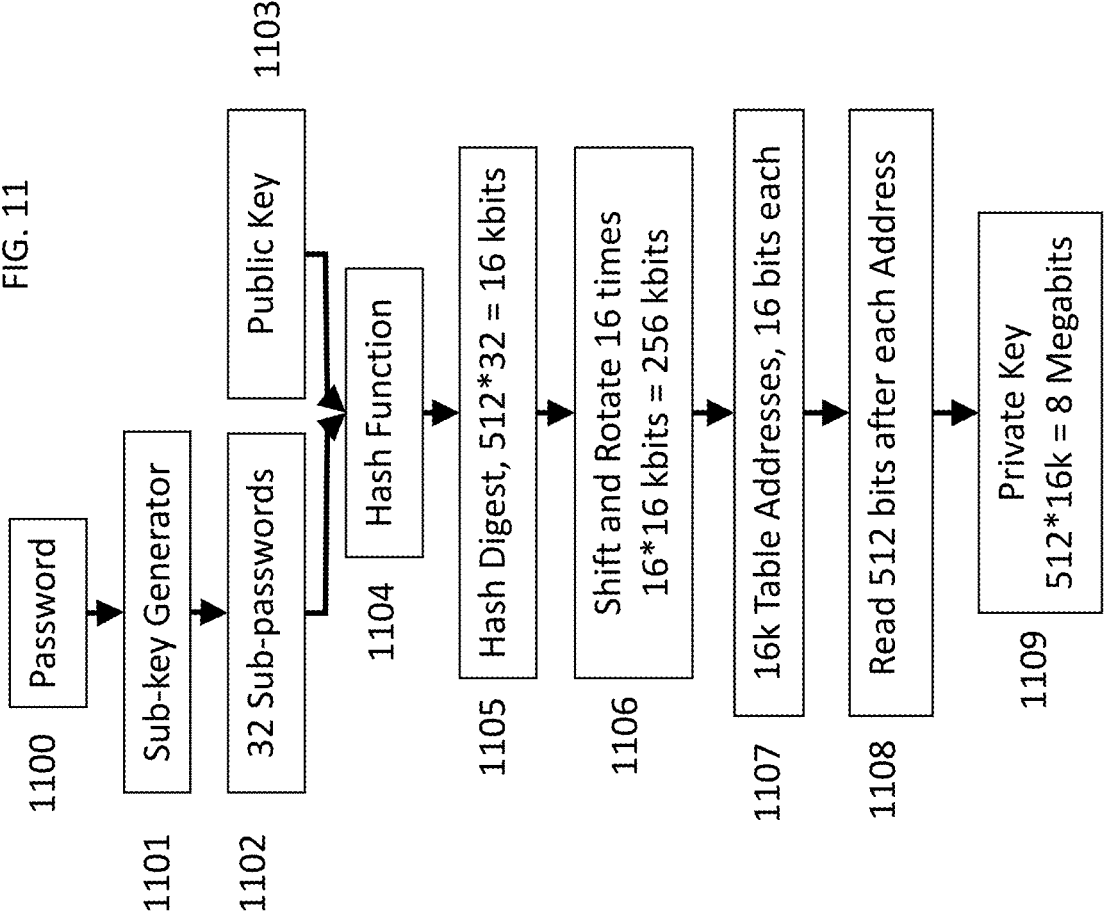
FIG. 11 illustrates a block diagram with a numerical example of the KVL generation process according to an embodiment comprising a second additional step to generate a longer KVL.

FIG. 11 shows an example process for generating an even longer private key. In this scheme, the password 1100 is used to generate 32 sub-passwords 1102 using a standard sub-key generator 1101. As in previous examples, the sub-passwords 1102 are combined with the public key 1103 by a hash function 1104, creating a hash digest 1105, which is shifted and rotated 1106 multiple times while being parsed into table addresses 1107.

Data streams 1108 are pulled from each table address 1107 and appended to generate the private key 1109. This method has the net effect of producing a private key 32 times longer than the original password alone. If this sub-password method is combined with the shift-and-rotate method of FIG. 10, the resulting private key may be up to 8 Mbits. The sub-password generator could be the sub-key generator of established cryptographic scheme such as Data Encryption Standard (DES) or Advanced Encryption Standard (AES), which generates several keys out of one cryptographic key. DES generates 16 sub-keys, while AES generates 10 to 14 keys.

Figure 12:
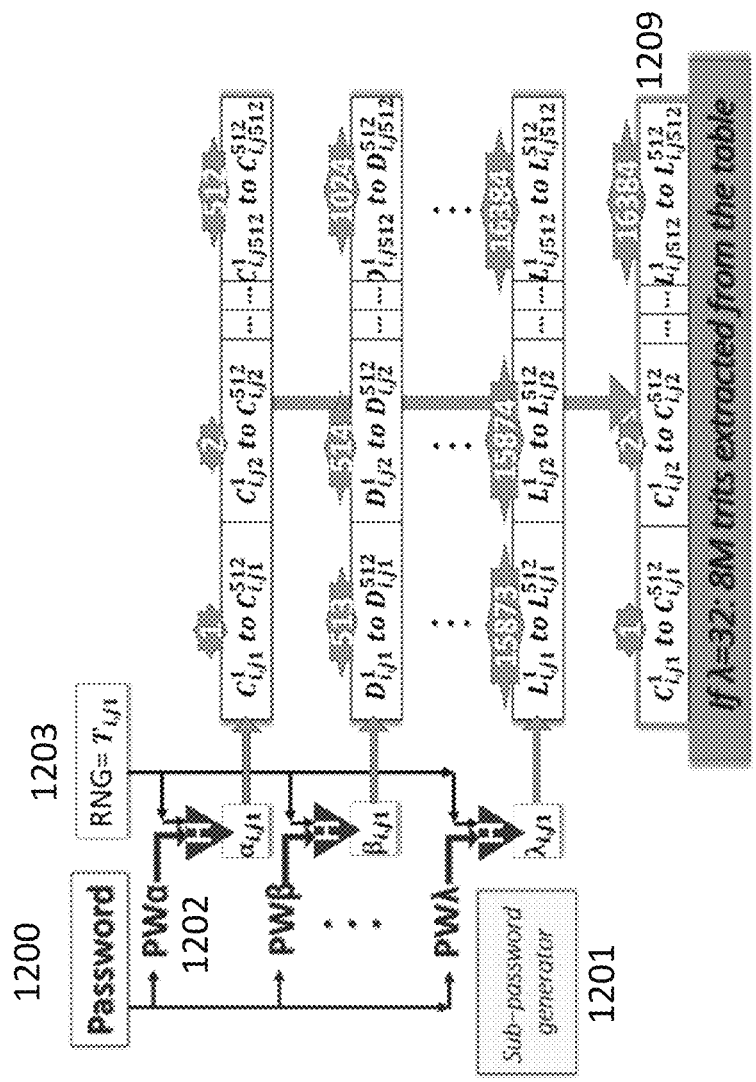
FIG. 12 illustrates a diagram of the KVL generation process according to an embodiment comprising a second additional step to generate a longer KVL comprised of trits.

FIG. 12 shows an example similar to FIG. 11 but with a cryptographic table containing trits rather than bits. The password 1200 is used to generate sub-passwords 1202 using a standard sub-key generator 1201. These sub-passwords 1202 are used with the public key 1203 to generate private key 1209 according to the process illustrated in FIG. 11.

Statistically, when 16,384 addresses are randomly selected out of 65,536 possible addresses, a non-negligible amount of collision is to be expected, and several addresses may be picked several times. By applying both the method of sub-passwords and the method of multiple instructions, it is expected that nearly all cases of collisions will occur less than 81 times in the same address (81 is calculated with 4 trits per instruction). So, it is possible to use the method to increase the number of generated addresses per message digest to 512×81=41 million. With 32 different sub-passwords, the length of the KVL can be 648 million elements. If a user needs even longer KVL, additional public keys can be added.

One method to use KVL to encrypt/decrypt plain texts is to generate a very long KVL and to point to a particular position of the key in such a way that several messages can use different portions of the KVL. This requires a counter that keeps track of the latest position in the key and to allocate the length of the next segment of the key to the next message to encrypt. Another method is to have a new public key to encrypt each new plain text and to adjust the length of the KVL to the length of the message to encrypt/decrypt.

In an embodiment, the present invention provides a method that generates keys with variable length, wherein the key generation is concurrently and independently done by two parties, occurring after the exchange of cryptographic tables storing a large quantity of random numbers done in a secure environment, the exchange passwords done in a secure environment, and the exchange of public keys done in an open, non-secure environment. The public keys, which have fixed lengths, may be generated by either party with random numbers. The generation of keys of variable length may comprise the step of measuring the length of the message to be encrypted to set the objective for the length of the key to be generated. When a relatively small cryptographic key is needed, each party may independently use the same hash function to transform a random number of the public keys into a hash message digest wherein said hash function digest is used to point to several addresses in the cryptographic table. At each address within a cryptographic table, the content of the cells located around the address is read and the information extracted is used to find a separate cryptographic table and the instruction needed to generate data streams from the cryptographic table to become part of the cryptographic key.

The data streams collected at each address in the cryptographic table pointed to by the hash function may be regrouped with the data collected at the other addresses to generate private keys, and the key is a combination of the data streams generated at each address. The cryptographic tables may be based on streams of binary data, ternary data, quaternary data, or another multi-state data.

The information stored in the cryptographic tables may come from random number generators or arrays of physically unclonable functions (PUFs) that are designed with SRAM memories, DRAM memories, Resistive RAM memories, magnetic memories, Flash memories, EEPROM memories, OTP memories, arrays of ring oscillator PUFs, gate delay oscillators, optical PUFs, Sensors, and MEMS PUFs. In some embodiments, an edit-spacing algorithm is used as instruction to generate a data stream.

In some cases, the addresses extracted from the hash message digest are parameters such as the coordinates (X, Y) in the array, the cells following a particular angle within the array, multiple locations spread across the array, and a combination thereof.

In an embodiment, a method of using a counter is described that keeps track of how many times the same address is solicited in a cryptographic scheme wherein a different instruction is selected each time to enhance the probability to have different data streams generated at that address when the hash function points to it a multitude of times.

In an embodiment, a method using a sub-password generator is described that generates several passwords from the password exchanged through a secure channel by two communicating parties wherein each sub-password generates a new message digest and each new message digest generates an additional key that can be used to increase the length of the key of variable lengths.

The sub-password generator may function in a similar manner to the sub-key generators of Data Encryption System (DES) and the Advanced Encryption Systems (AES).

The present method may be utilized with client devices selected from smart cards, SIM cards, banking cards, secure microcontrollers, Internet of Things (IoT), connected devices, identification cards, smart passports, transport titles, computers, workstations, telephones, smart phones, tablets, servers, base stations, drones, unmanned aerial vehicles (UAVs), electric vehicles, airplanes, satellites, or another device connected to a physical cyber system.

The present method may be combined with additional cryptographic protocols to secure the data transfer between one or more physical cyber elements, including public key infrastructure (PM), use of private keys, use of symmetrical cryptography, asymmetrical cryptography, RSA, DES, AES, secret key exchange methods, quantum cryptography, Elliptic Curve Cryptography, hash function, and the use of biometric prints.

In some cases, the present method may be combined with multi-factor authentication to protect the hash function or the private key generation. In embodiments, the method may use a password selected from an alpha numeric password, a pin code, a fingerprint, a retina print, and a biometric print to generate the output data stream.

When transmitting a message, the message to be encrypted by the key of variable lengths is encrypted by applying a XOR function between the message and the key of variable length. Alternatively, the message to be encrypted by the key of variable length is encrypted by applying a Boolean or an arithmetic function between the message and the key of variable length.

One skilled in the art will realize that a virtually unlimited number of variations to the above descriptions are possible, and that the examples and the accompanying figures are merely to illustrate one or more examples of implementations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments or implementations disclosed, but that such claimed subject matter may also include all embodiments or implementations falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment," "an embodiment," "one implementation," or "an implementation" may mean that a particular feature, structure, or characteristic described in connection with a particular embodiment or implementation may be included in at least one embodiment or implementation of claimed subject matter. Thus, appearances of the phrase "in one embodiment," "an embodiment," "one implementation," or "an implementation" in various places throughout this specification are not necessarily intended to refer to the same embodiment or implementation, or to any one particular embodiment or implementation described. Furthermore, it is to be understood that particular features, structures, or characteristics described may be combined in various ways in one or more embodiments or implementations. In general, of course, these and other issues may vary with the particular context of usage. Therefore, the particular context of the description or the usage of these terms may provide helpful guidance regarding inferences to be drawn for that context.

What is claimed is:

1. A computing device, comprising:
   a non-volatile memory including a cryptographic table comprising an array of addressable elements that cannot be replicated by a multilinear map algorithm, wherein each addressable element has a numerical value;
   a network interface configured to communicate using a communications network; and
   a processor coupled to the network interface, the processor being configured to execute instructions for:
      receiving, using the network interface, a public key and an encrypted message;
      combining the public key with an additional identifying information to generate a first input;
      executing a hash function on the first input to generate a hash digest;
      parsing the hash digest into a first set of addresses, wherein each address in the first set of addresses identifies an addressable element in the cryptographic table, wherein the cryptographic table is generated before receiving the public key and the encrypted message, using a true random generator such that the addressable elements in the cryptographic table must be securely download from a sender to a receiver for the first set of addresses to identify an addressable element in the cryptographic table, and wherein the addressable element is determinable only using the cryptographic table;
      generating a private key by retrieving numerical values associated with the addressable elements in the cryptographic table having addresses in the first set of addresses; and
      decrypting the encrypted message using the private key to generate an unencrypted message.

2. The computing device of claim 1, wherein the cryptographic table comprises an array of trits.

3. The computing device of claim 1, wherein decrypting the encrypted message using the private key includes combining the encrypted message and the private key using an exclusive or (XOR) operation.

4. The computing device of claim 1, wherein the process of retrieving numerical values from the cryptographic table is modified by a set of varying retrieval instructions, wherein a selected instruction from the set of varying retrieval instructions is determined for each address.

5. The computing device of claim 4, wherein the selected instruction from the set of varying retrieval instructions is determined by the numerical values associated with the addressable elements in the cryptographic table having addresses in the first set of addresses.

6. The computing device of claim 1, wherein the additional identifying information comprises a password received from a user.

7. The computing device of claim 6, wherein the processor applies a sub-key generator to the password to generate additional passwords.

8. A computing device, comprising:
   a non-volatile memory, including a cryptographic table comprising an array of addressable elements that cannot be replicated by a multilinear map algorithm, wherein each addressable element has a numerical value;
   a network interface configured to communicate using a communications network; and
   a processor coupled to the network interface, including a random number generator, the processor being configured to execute instructions for:
      generating a random public key by extracting a random number from the random number generator;

combining the random public key with an additional identifying information to generate a first input;

executing a hash function on the first input to generate a hash digest;

parsing the hash digest into a first set of addresses, wherein each address in the first set of addresses identifies an addressable element in the cryptographic table, wherein the cryptographic table is generated before receiving the public key and the encrypted message, using a true random generator such that the addressable elements in the cryptographic table must be securely download from a sender to a receiver for the first set of addresses to identify an addressable element in the cryptographic table, and wherein the addressable element is determinable only using the cryptographic table;

generating a private key by retrieving numerical values associated with the addressable elements in the cryptographic table having addresses in the first set of addresses;

encrypting an unencrypted message using the private key to generate an encrypted message; and sending, using the network interface, the random public key and the encrypted message.

9. The computing device of claim 8, wherein the cryptographic table comprises an array of trits or multi-state elements.

10. The computing device of claim 8, wherein encrypting the unencrypted message using the private key includes combining the unencrypted message and the private key using an exclusive or (XOR) operation.

11. The computing device of claim 8, wherein the process of retrieving numerical values from the cryptographic table is modified by a set of varying retrieval instructions, wherein a selected instruction from the set of varying retrieval instructions is determined for each address.

12. The computing device of claim 11, wherein the selected instruction from the set of varying retrieval instructions is determined by the numerical values associated with the addressable elements in the cryptographic table having addresses in the first set of addresses.

13. The computing device of claim 8, wherein the additional identifying information comprises a password.

14. The computing device of claim 13, wherein the processor applies a sub-key generator to the password to generate additional passwords.

15. A method of decrypting an encrypted message, comprising:

receiving, using a network interface configured to communicate using a communication network, a public key and an encrypted message;

combining, using a processor coupled to the network interface and configured to execute instructions, the public key with an additional identifying information to generate a first input;

executing a hash function on the first input to generate a hash digest;

parsing the hash digest into a first set of addresses, wherein each address in the first set of addresses identifies an addressable element in a cryptographic table, wherein addressable elements in the cryptographic table cannot be replicated by a multilinear map algorithm, wherein the cryptographic table is stored within a non-volatile memory coupled to the processor, wherein the cryptographic table is generated before receiving the public key and the encrypted message, using a true random generator such that the addressable elements in the cryptographic table must be securely download from a sender to a receiver for the first set of addresses to identify an addressable element in the cryptographic table, and wherein the addressable element is determinable only using the cryptographic table;

generating a private key by retrieving numerical values associated with the addressable elements in the cryptographic table having addresses in the first set of addresses; and decrypting the encrypted message using the private key to generate an unencrypted message.

16. The method of claim 15, wherein the cryptographic table comprises an array of trits or multi-state elements.

17. The method of claim 15, wherein decrypting the encrypted message using the private key includes combining the encrypted message and the private key using an exclusive or (XOR) operation.

18. The method of claim 15, wherein the process of retrieving numerical values from the cryptographic table is modified by a set of varying retrieval instructions, wherein a selected instruction from the set of varying retrieval instructions is determined for each address.

19. The method of claim 18, wherein the selected instruction from the set of varying retrieval instructions is determined by the numerical values associated with the addressable elements in the cryptographic table having addresses in the first set of addresses.

20. The method of claim 15, wherein the additional identifying information comprises a password received from a user.

* * * * *